US011868221B2

(12) United States Patent
Kelley et al.

(10) Patent No.: US 11,868,221 B2
(45) Date of Patent: Jan. 9, 2024

(54) MULTI-ADAPTIVE CACHE REPLACEMENT POLICY

(71) Applicant: Advanced Micro Devices, Inc., Santa Clara, CA (US)

(72) Inventors: John Kelley, Fort Collins, CO (US); Vanchinathan Venkataramani, Bangalore (IN); Paul J. Moyer, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/490,862

(22) Filed: Sep. 30, 2021

(65) Prior Publication Data
US 2023/0109344 A1  Apr. 6, 2023

(51) Int. Cl.
| G06F 11/00 | (2006.01) |
| G06F 11/263 | (2006.01) |
| G06F 11/30 | (2006.01) |
| G06F 11/07 | (2006.01) |
| G06F 11/34 | (2006.01) |

(52) U.S. Cl.
CPC ......... *G06F 11/263* (2013.01); *G06F 11/076* (2013.01); *G06F 11/3037* (2013.01); *G06F 11/3409* (2013.01); *G06F 11/3457* (2013.01)

(58) Field of Classification Search
CPC .. G06F 11/263; G06F 11/076; G06F 11/3037; G06F 11/3409
See application file for complete search history.

(56) References Cited

U.S. PATENT DOCUMENTS

| 6,523,092 B1 * | 2/2003 | Fanning | G06F 12/127 711/134 |
| 10,713,750 B2 * | 7/2020 | Koker | G06F 12/0815 |
| 2017/0315932 A1 * | 11/2017 | Moyer | G06F 12/0862 |
| 2020/0410632 A1 * | 12/2020 | Koker | G06F 12/127 |

OTHER PUBLICATIONS

Qureshi, M. K, et al., "Adaptive Insertion Policies for High Performance Caching", Proceedings of the 34th Annual International Symposium on Computer Architecture, ACM, 11 pages, Jun. 2007.

* cited by examiner

*Primary Examiner* — Amine Riad
(74) *Attorney, Agent, or Firm* — Volpe Koenig (57) ABSTRACT

Techniques for performing cache operations are provided. The techniques include tracking performance events for a plurality of test sets of a cache, detecting a replacement policy change trigger event associated with a test set of the plurality of test sets, and in response to the replacement policy change trigger event, operating non-test sets of the cache according to a replacement policy associated with the test set.

20 Claims, 5 Drawing Sheets

MULTI-ADAPTIVE CACHE REPLACEMENT POLICY

BACKGROUND

Modern microprocessors implement a wide array of features for high throughput. Some such features include having highly advanced caches for high performance memory operations. Improvements to such features are constantly being made.

BRIEF DESCRIPTION OF THE DRAWINGS

A more detailed understanding may be had from the following description, given by way of example in conjunction with the accompanying drawings wherein.

DETAILED DESCRIPTION

Techniques for performing cache operations are provided. The techniques include tracking performance events for a plurality of test sets of a cache, detecting a replacement policy change trigger event associated with a test set of the plurality of test sets, and in response to the replacement policy change trigger event, operating non-test sets of the cache according to a replacement policy associated with the test set.

Figure 1:
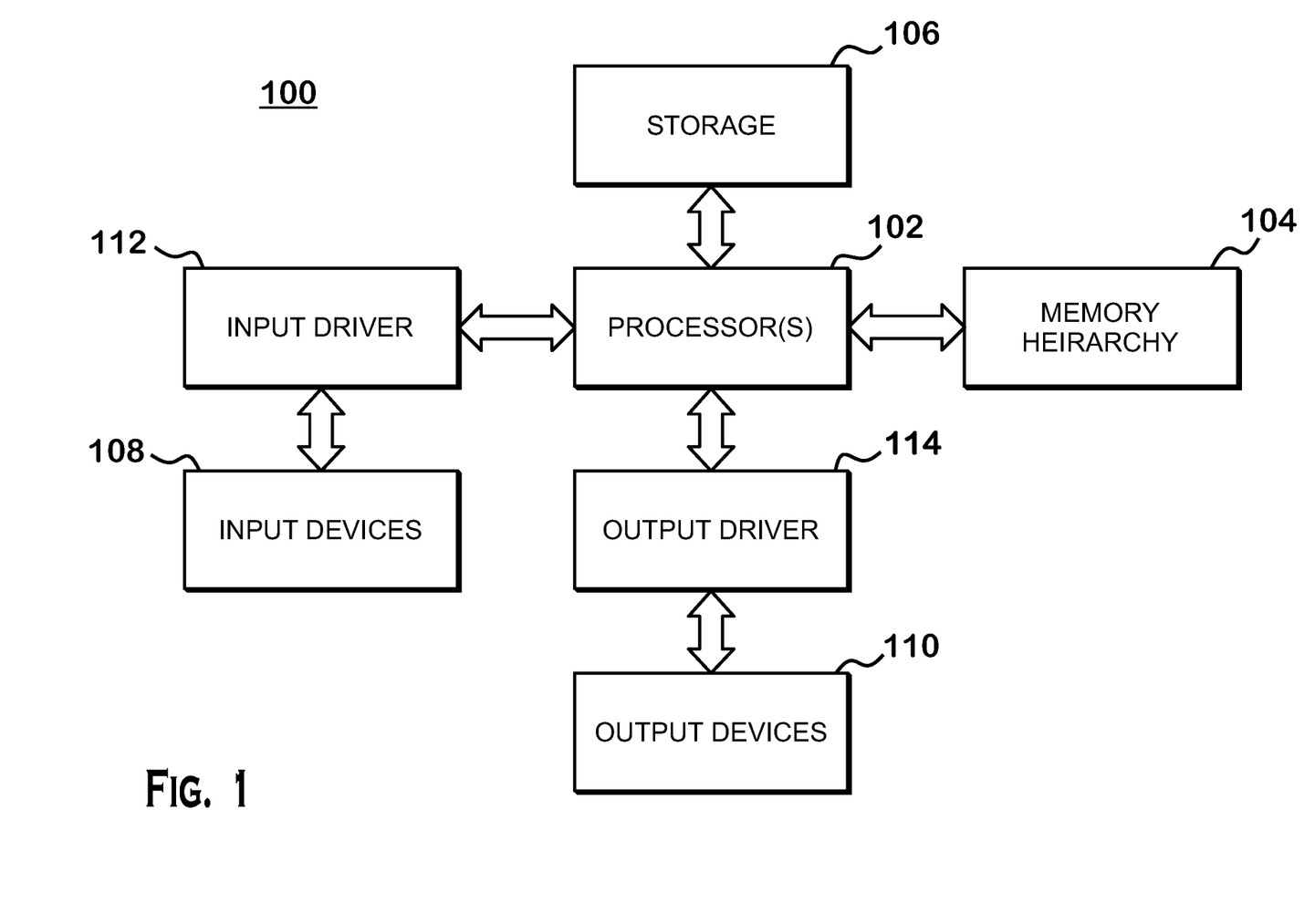
FIG. 1 is a block diagram of an example device in which one or more disclosed embodiments may be implemented.

FIG. 1 is a block diagram of an example device 100 in which aspects of the present disclosure are implemented. The device 100 includes, for example, a computer, a gaming device, a handheld device, a set-top box, a television, a mobile phone, or a tablet computer. The device 100 includes one or more processors 102, a memory hierarchy 104, a storage device 106, one or more input devices 108, and one or more output devices 110. The device 100 may also optionally include an input driver 112 and an output driver 114. It is understood that the device 100 may include additional components not shown in FIG. 1.

The one or more processors 102 includes a central processing unit (CPU), a graphics processing unit (GPU), a CPU and GPU located on the same die, or one or more processor cores, wherein each processor core is a CPU or a GPU. In some examples, the one or more processors 102 includes any number of processors. In some examples, the one or more processors 102 includes one or more processor chips. In some examples, each processor chips includes one or more processor cores.

Part or all of the memory hierarchy 104 may be located on the same die as one or more of the one or more processors 102, or may be located partially or completely separately from the one or more processors 102. The memory hierarchy 104 includes, for example, one or more caches, one or more volatile memories, one or more non-volatile memories, and/or other memories, and may include one or more random access memories ("RAM") of one or a variety of types. In various examples, one or more of the caches of the memory hierarchy 104 include one or more associated cache controllers.

In some examples, the elements of the memory hierarchy 104 are arranged in a hierarchy that includes the elements of the one or more processors 102. Examples of such an arrangement is provided in FIGS. 3 and 4A-4D.

The storage device 106 includes a fixed or removable storage, for example, a hard disk drive, a solid state drive, an optical disk, or a flash drive. The input devices 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
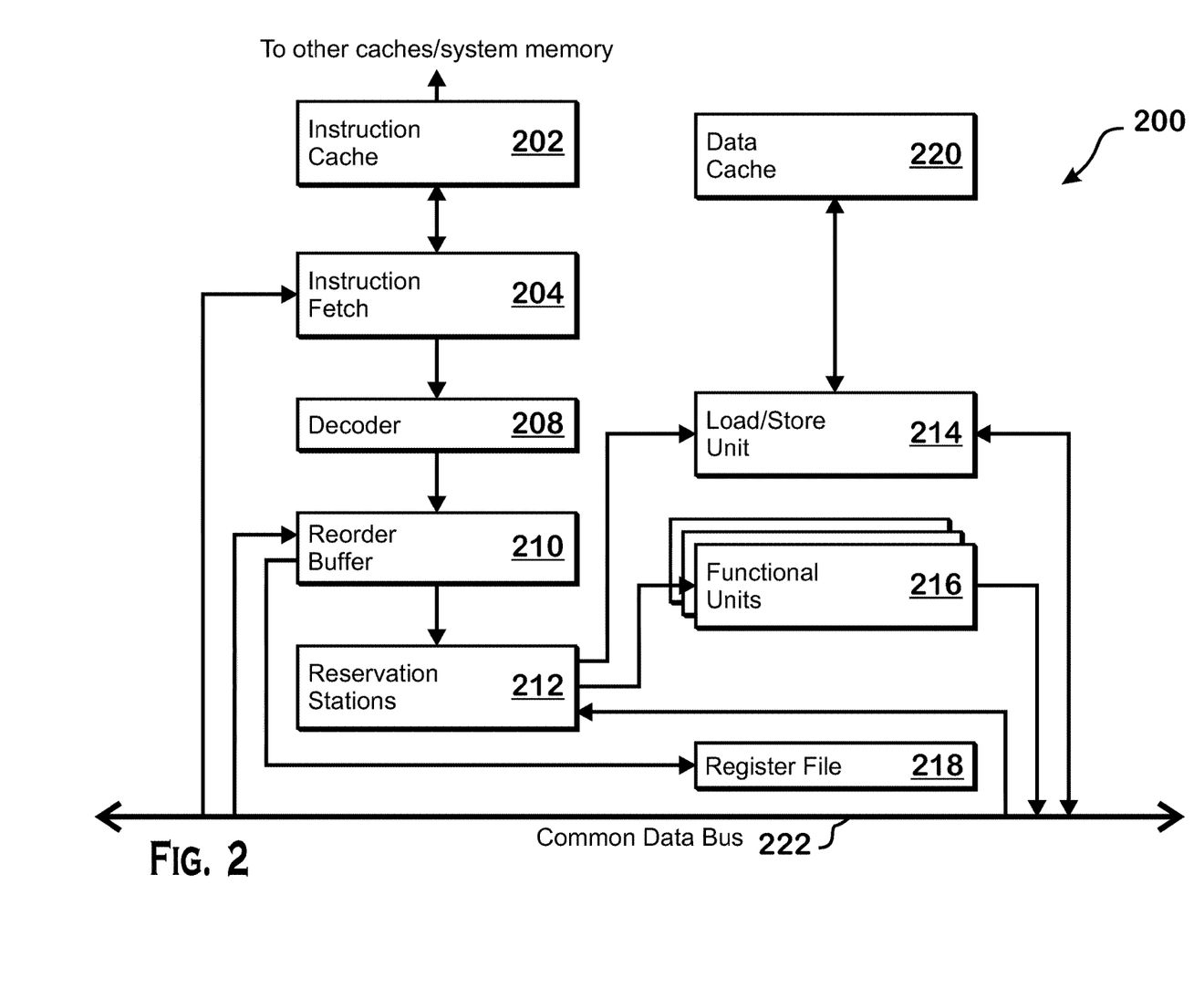
FIG. 2 is a block diagram of an instruction execution pipeline, located within the processor of FIG. 1.

FIG. 2 is a block diagram of an instruction execution pipeline 200, located within the one or more processors 102 of FIG. 1. In various examples, any of the processor cores of the one or more processors 102 of FIG. 1 are implemented as illustrated in FIG. 2.

The instruction execution pipeline 200 retrieves instructions from memory and executes the instructions, outputting data to memory and modifying the state of elements within the instruction execution pipeline 200, such as registers within register file 218.

The instruction execution pipeline 200 includes an instruction fetch unit 204 configured to fetch instructions from system memory (such as memory 104) via an instruction cache 202, a decoder 208 configured to decode fetched instructions, functional units 216 configured to perform calculations to process the instructions, a load store unit 214, configured to load data from or store data to system memory via a data cache 220, and a register file 218, which includes registers that store working data for the instructions. A reorder buffer 210 tracks instructions that are currently in-flight and ensures in-order retirement of instructions despite allowing out-of-order execution while in-flight. "In-flight" instructions refers to instructions that have been received by the reorder buffer 210 but have not yet had results committed to the architectural state of the processor (e.g., results written to a register file, or the like). Reservation stations 212 maintain in-flight instructions and track instruction operands. When all operands are ready for execution of a particular instruction, reservation stations 212 send the instruction to a functional unit 216 or a load/store unit 214 for execution. Completed instructions are marked for retirement in the reorder buffer 210 and are retired when at the head of the reorder buffer queue 210. Retirement refers to the act of committing results of an instruction to the architectural state of the processor. For example, writing an addition result to a register, by an add instruction, writing a loaded value to a register by a load instruction, or causing instruction flow to jump to a new location, by a branch instruction, are all examples of retirement of the instruction.

Various elements of the instruction execution pipeline 200 communicate via a common data bus 222. For example, the functional units 216 and load/store unit 214 write results to the common data bus 222 which may be read by reservation stations 212 for execution of dependent instructions and by the reorder buffer 210 as the final processing result of an in-flight instruction that has finished execution. The load/store unit 214 also reads data from the common data bus 222. For example, the load/store unit 214 reads results from completed instructions from the common data bus 222 and writes the results to memory via the data cache 220 for store instructions.

One or more of the various caches of the memory hierarchy 104 implement cache line replacement policies to determine which cache lines to evict when an eviction occurs. In some examples, an eviction occurs in the event that a cache line is to be stored in the cache and there are no slots available for the cache line. In some examples, such as with set associative caches, each cache line is permitted to be stored in a particular set (usually identified by some combination of bits of the cache line address), each of which includes multiple "ways." A combination of set and way identifies a slot in a cache. If all cache lines in a particular set are in use (e.g., not invalid) when another cache line is to be stored in that set, then one of the cache lines is evicted. In some examples, a cache controller identifies a cache line to be evicted based on an eviction policy. Some example eviction policies include least-recently-used, most-recently-used, or other eviction policies. In least-recently-used, the cache line that was last accessed the longest amount of time prior is selected for eviction. In most-recently-used, the cache line that was last accessed the shortest amount of time prior is selected for eviction. In another example, custom age cache replacement policies can be used, where a custom age cache replacement policy indicates that cache lines of a particular age (e.g., second most recently used or the like) that is to be evicted. Other cache replacement policies include first-in-first-out, where cache lines are evicted in the order the cache lines are stored into the cache, last-in-first-out, where cache lines are evicted in the reverse of the order in which the cache lines are stored in the cache, random replacement, where a random line is selected for eviction, least-frequently used, where the cache line that is least frequently accessed is evicted, or any other technically feasible cache replacement policy. Any of a very large number of replacement policies are possible.

Figure 3:
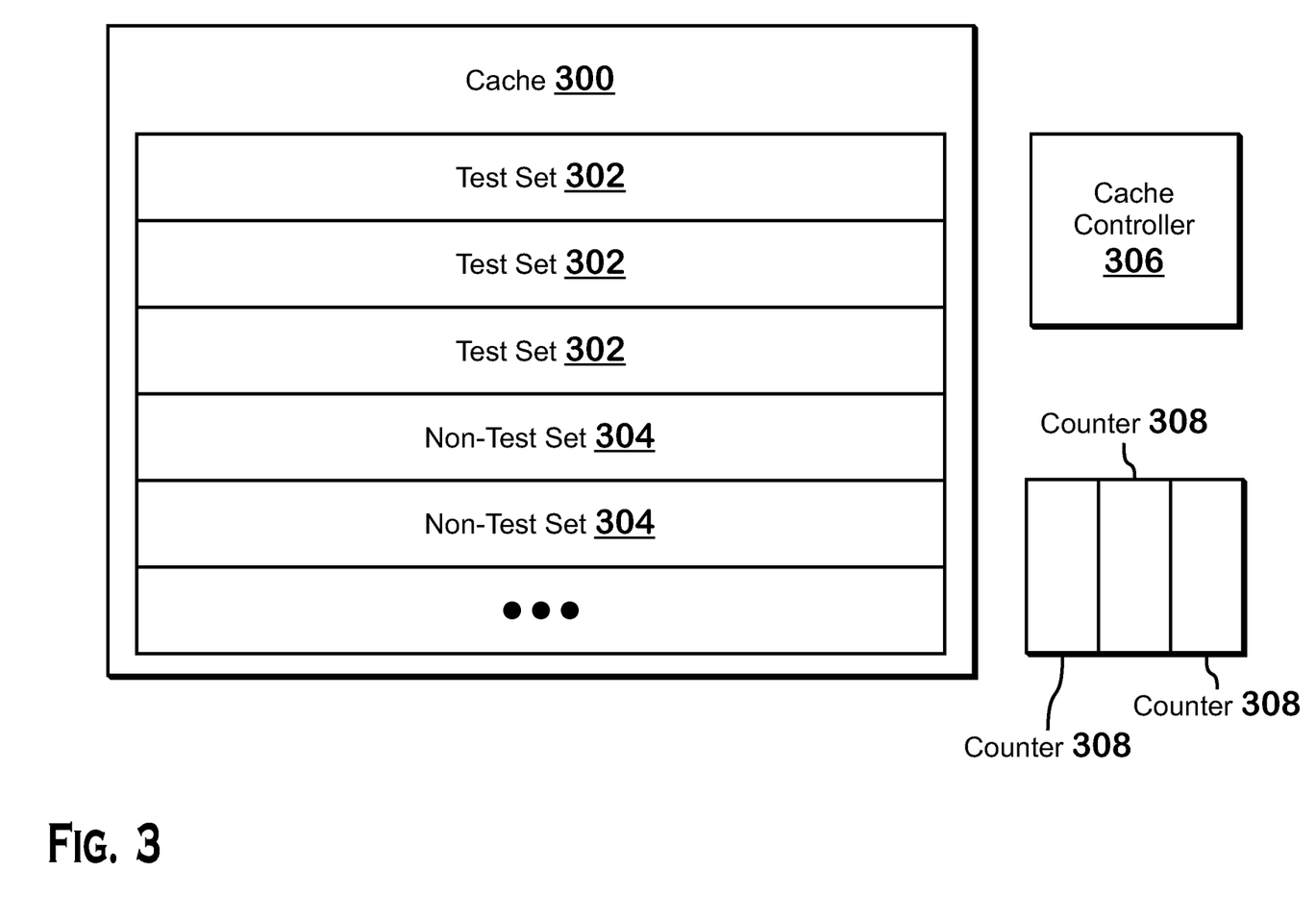
FIG. 3 is a block diagram of a cache, according to an example.

FIG. 3 illustrates a cache 300 that implements a multi-policy adaptive cache replacement policy, according to an example. In some examples, the cache 300 is one of the caches of the memory hierarchy 104 of FIG. 1, and in other examples, the cache 300 is used in any technically feasible context, such as for memories other than cache memories.

The cache 300 includes a plurality of test sets 302, a plurality of non-test sets 304, and a cache controller 306. The cache controller 306 operates each of the test sets 302 with different cache replacement policies, "testing" each of these different replacement policies in the individual test sets. Based on the results of these operations, the cache controller 306 operates the non-test set 304 according to the replacement policy deemed to be most desirable. The replacement policies that are tested are, in various examples, any of the replacement policies described herein, or any other technically feasible replacement policy.

To test different replacement policies in the test sets 302, the cache controller 306 operates different test sets 302 according to a particular cache replacement policy. More specifically, for each particular test set 302, the cache controller 306 services evictions for that test set 302 according to the replacement policy for that test set 302. Servicing evictions according to that replacement policy means that when a cache line is to be placed in the test set 302, and the test set has no invalid cache lines or is otherwise considered "full," the cache controller 306 selects a cache line for eviction based on the replacement policy for that test set 302. It should be of course understood that cache lines are assigned to particular sets based on aspects of the cache line such as certain bits of the address of the cache line. Thus for any particular cache line to be stored into the cache, that cache line can be stored in a limited number of sets (e.g., one set).

Each different test set 302 is operated with a different test replacement policy, and the cache controller 306 measures performance events to determine which test replacement to apply to the remainder of the cache—the non-test sets 304. In response to a replacement policy change trigger event, the cache controller 306 changes the replacement policy for the non-test sets 304, which causes the non-test sets 304 to operate according to the replacement policy of the test set 302 whose replacement policy is deemed most desirable. In various examples, a replacement policy trigger event is any technically feasible event that causes the cache controller 306 to switch the replacement policy for the non-test sets 304. In some examples, a replacement policy trigger event occurs in response to "most desirable" replacement policy becoming different than the policy with which the cache controller 306 is currently operating the non-test sets 304. In some examples, the cache controller 306 periodically evaluates the measured performance events to determine which replacement policy is deemed most desirable. Thus in such examples, the replacement policy trigger event is, at a periodic evaluation time, the cache controller 306 determining that a replacement policy is "most desirable," where that replacement policy is not the replacement policy with which the cache controller 306 is current operating the non-test sets 304.

In some examples, the performance metric for a test set 302 includes at least a number of misses detected in that test set 302. A test set 302 with the fewest number of misses is deemed to have a "most desirable" replacement policy because the replacement policy that leads to the fewest number of misses results in greater performance, since servicing a miss requires a large amount of time. In examples where the "most desirable" replacement policy is the test set 302 exhibiting the fewest number of misses, it is shown that this replacement policy is considered to be the best at predicting which cache lines are most likely to be used in the future by evicting cache lines least likely to be used in the future.

Above, it is stated that the cache controller 306 operates the non-test sets 304 according to the most desirable replacement policy. In some examples, operating the non-test sets 304 according to a particular replacement policy includes, in response to a cache line being requested to be stored in the cache (e.g., due to a cache miss for the processor 102 or another unit or due to a prefetch request), determining that there are no free slots in the set associated with the cache line, selecting a cache line in that set for eviction according to the replacement policy, evicting the selected cache line, and storing the requested cache line into the cache within the slot of the now-evicted cache line.

In some examples, the cache controller 306 utilizes a set of counters 308 to record information about the performance events. More specifically, the cache controller 306 maintains one counter 308 for each test set 302. Each counter has a range between 0 and a maximum number. Each time a miss occurs for a test set 302, the cache controller 306 increments the counter 308 associated with the test set 302. In some examples, to prevent counter saturation, each time a counter 308 reaches its maximum value, the cache controller 306 decrements all counters by a value such as a fixed amount, by a percentage, or by some other value. The test set 302 whose counter 308 has the lowest value (therefore, for example, representing the smallest number of misses) is the test set 302 whose replacement policy is considered the "most desirable."

In some implementations, the cache controller 306 switches operation of the cache 300 between a normal mode and a no-test mode. In the normal mode, the cache controller 306 operates the cache 300 as described above, using the test sets 302 to test particular replacement policies, and operating the non-test sets 304 according to the replacement policy deemed most desirable. In the no-test mode, the cache controller 306 operates all sets, include test sets 302 and non-test sets 304, according to the cache replacement policy deemed "most desirable."

In some examples, the cache controller 306 switches between the normal mode and the no-test mode based on a confidence metric. When the cache controller 306 determines that the replacement policy associated with a particular non-test set 304 is considered most desirable with a high degree of confidence, the cache controller 306 operates the cache 300 in the no-test mode, according to the replacement policy deemed most desirable with a high degree of confidence. After a no-test mode end trigger, the cache controller 306 returns to the normal mode. In some examples, the no-test mode end trigger includes a certain time period elapsing. The time is, in various examples, a real time (e.g., a given number of milliseconds), a number of cycles, or a different quantization of time. In other examples, time is a measure of the number of accesses to either or both of the test sets 302 and the non-test sets 304. In some examples, this number is tracked by the counters 308 and in other examples, this number is not tracked by the counters 308. The no-test mode end trigger is alternatively any other technically feasible mechanism for ending the no-test mode.

In some examples, the confidence metric is a difference between values of the counters 308. More specifically, in some examples, if the counter 308 with the lowest value is at least a threshold amount lower than any other value of any other counter 308, then the confidence metric indicates that the cache controller 306 should switch to the no-test mode. In other examples, the cache controller 306 determines that the cache controller 306 should switch to the no-test mode based on any other technically feasible means of interpreting the values of the counters 308. In general, these techniques evaluate the counters 308 to evaluate whether a particular replacement policy is the "most desirable," with a sufficiently high confidence. If there is such a replacement policy, then the cache controller 306 enters the no-test mode as described.

In some examples, the cache controller 306 implements at least three test sets 302. Thus while in the normal mode, the cache controller 306 tests at least three different replacement policies and selects one of them for operation of the non-test sets 304. Further, in such examples, there are at least three counters 308.

FIGS. 4A-4D illustrate example operations related to operating a cache 300 according to one of a set of cache replacement policies, according to examples.

Figure 4A:
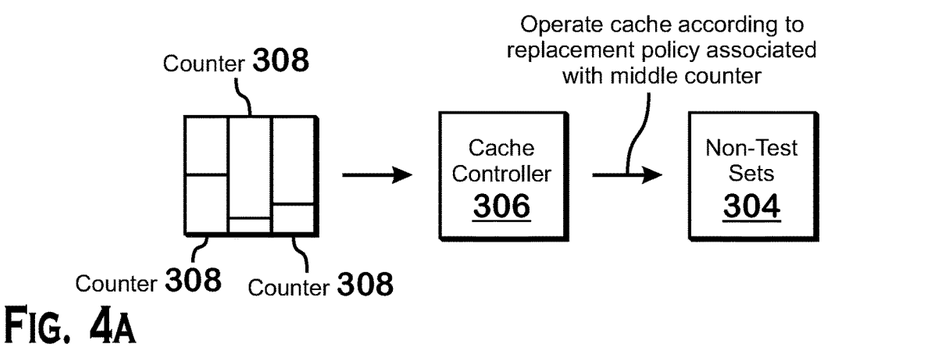
FIGS. 4A-4D illustrate cache operations, according to examples.

FIG. 4A illustrates an operation in which a cache controller 306 selects a replacement policy based on counter values 308. In the example, the middle counter 308 has the lowest value, as shown, and so the cache controller 306 operates the non-test sets 304 according to the replacement policy associated with the middle counter 308. As described elsewhere herein, operating according to that replacement policy means, when an eviction occurs in a non-test set 304, the cache controller 306 selects a cache line for eviction based on a replacement policy associated with the middle counter 308. Further, the middle counter 308 is being operated by the cache controller 3006 according to that replacement policy, in a testing mode.

Figure 4B:
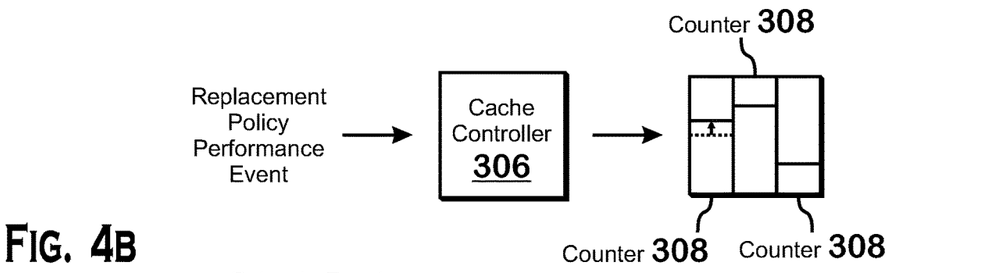

FIG. 4B illustrates an operation in which the counters 308 are updated. In FIG. 4B, the cache controller 306 detects a replacement policy performance event. The replacement policy performance event includes an event that indicates information about the performance of one or more of the replacement policies associated with the counters 308. In an example, a performance event is a miss in one of the non-test sets 304. In response to the replacement policy performance event, the cache controller 306 updates the counter 308 for which the replacement policy performance event occurs. In an example in which the performance event is a miss, the cache controller 306 increments the counter 308 for the non-test set 304 in which the miss occurred. In FIG. 4B, the non-test set 304 for which the miss occurs is associated with the left counter 308, and thus that counter 308 is incremented as shown by the arrow pointing up.

Figure 4C:
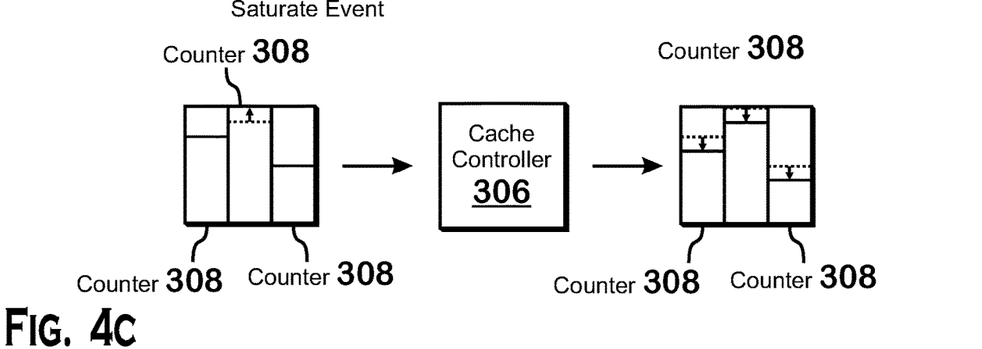

FIG. 4C illustrates a saturate event, according to an example. In the example, the middle counter 308 has been incremented and is at the maximum value. In response to the middle counter 308 being at the maximum value, the cache controller reduces the value of all counters 308 by an amount, as shown by the downward pointing arrows. The example shown is one in which saturation occurs where a counter 308 reaches a maximum value. In some examples, a saturate event also occurs where a counter 308 reaches a minimum value (such as 0). In that situation, the cache controller 306 increments each counter 308 by an amount such as a fixed amount, a percentage, or some other amount.

Figure 4D:
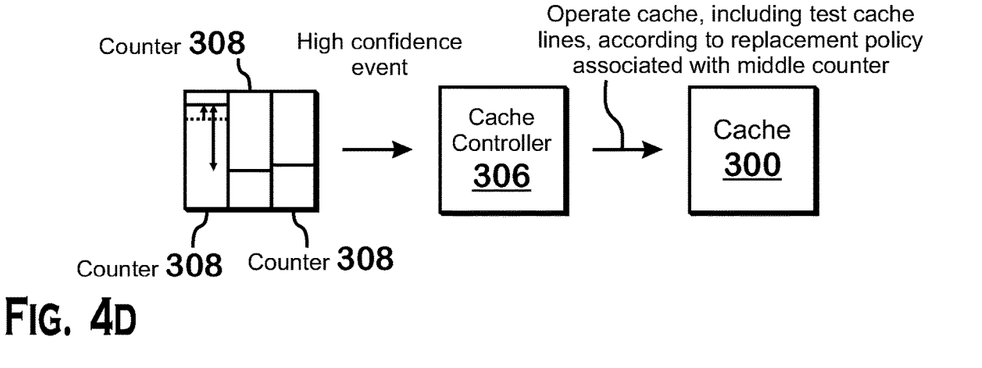

FIG. 4D illustrates a high confidence event that acts as a trigger to operate in a no-test mode, according to an example. In the example, the high confidence event includes the middle counter 308 being at least a threshold amount lower than the next highest counter 308, as shown by the double-headed arrow. In response to this high confidence event, the cache controller 306 operates the cache 300, including the non-test sets 304 and the test sets 302, according to the replacement policy associated with the middle counter 308. Note the left counter 308 has incremented its value, thus bringing its value to more than the threshold amount above the value of the middle counter 308.

Figure 5:
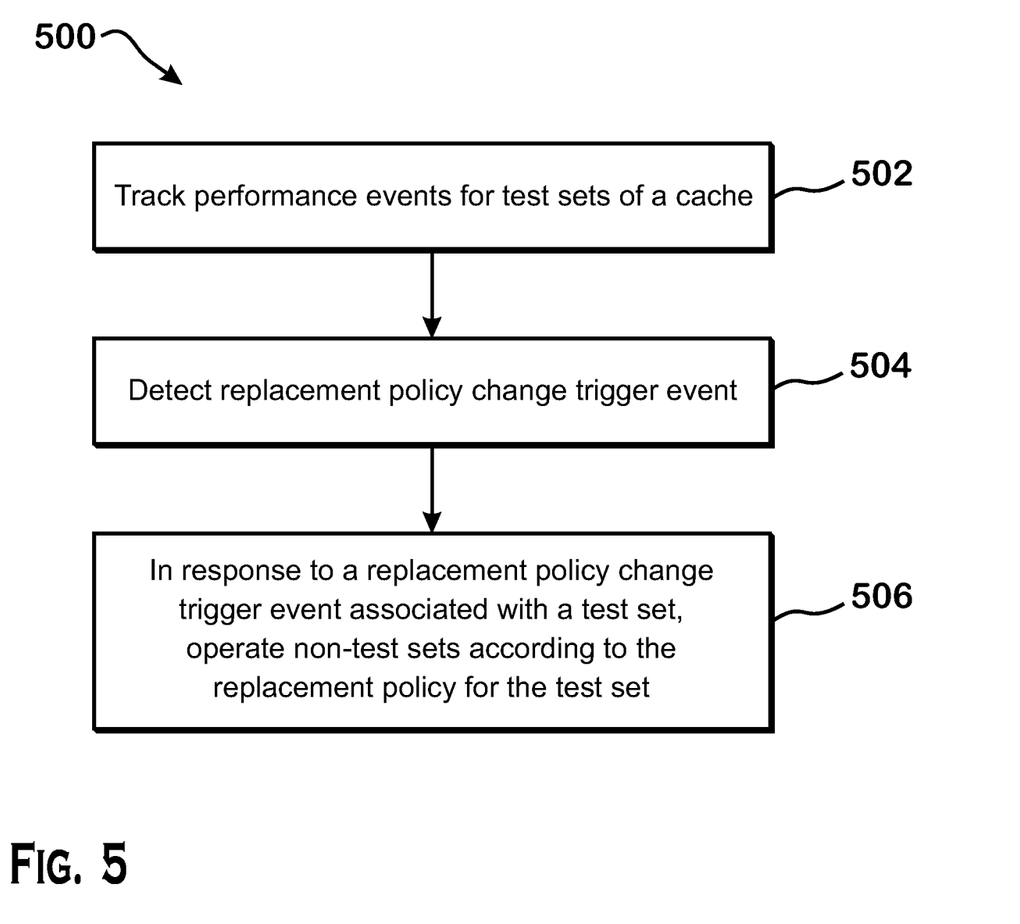
FIG. 5 is a flow diagram of a method for performing cache operations, according to an example.

FIG. 5 is a flow diagram of a method 500 for operating a cache, according to an example. Although described with respect to the system of FIGS. 1-4D, those of skill in the art will understand that any system, configured to perform the steps in any technically feasible order, falls within the scope of the present disclosure.

At step 502, the cache controller 306 tracks performance events for test sets 302 of a cache 300. In some examples, the performance events are misses in the test sets 302. In some examples, the cache controller 306 increments a counter value associated with a particular test set 302 when a miss occurs in that test set 302. In some examples, the cache controller 306 decrements each counter when the value of one counter is incremented to the maximum value.

At step 504, the cache controller 306 detects a replacement policy change trigger event. In some examples, the replacement policy change trigger event includes the cache controller 306 detecting that a count representative of a number of performance events (e.g., cache misses) for a particular test set 302 is lower than the count representative of a number of performance events for all other test sets 302. In some examples, the cache controller 306 uses the values in the counters 308 to make this determination. More specifically, in some examples, the cache controller 306 detects that the value of a particular counter 308 is lower than the values in all other counters 308. In response to this detection, the cache controller 306 detects the replacement policy change trigger event. As described elsewhere herein, the counters 308 are updated based on the performance events of step 502.

At step 506, in response to the replacement policy change trigger event associated with the test set 302, the cache controller 306 operates the non-test sets 304 according to the replacement policy associated with that test set 302. Thus in some examples, in response to value of a counter 308 being lower than the value of other counters 308, the cache controller 306 operates the test sets 302 according to the replacement policy associated with that test set 302.

It should be understood that many variations are possible based on the disclosure herein. Although features and elements are described above in particular combinations, each feature or element may be used alone without the other features and elements or in various combinations with or without other features and elements. For example, although described going in a particular direction (e.g., incrementing when a miss occurs), in some examples, the counter is modified in the opposite direction, and the detection events are reversed (e.g., misses cause the counters to decrement, saturate occurs at 0, with the values being increased upon saturation occurring, and the counter with this highest value is the counter whose replacement policy is selected).

The various elements illustrated in the Figures are implementable as hardware (e.g., circuitry), software executing on a processor, or a combination of hardware and software. In various examples, each block, such as the illustrated units of the instruction execution pipeline 200 and the computer system 100, and the cache 300, test sets 302, non-test sets 304, cache controller 306, counters 308, are implementable as hardware (e.g., a hardware processor and/or a circuit), software, or a combination thereof. The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for operating a cache using a cache controller in conjunction with a plurality of counters, comprising:
   tracking performance events for a plurality of test sets of a cache, by the cache controller the performance events including a miss count for each test set, the tracking including decrementing all miss counts in response to at least one miss count arriving at a maximum value wherein the miss counts are stored in the counters;
   detecting a replacement policy change trigger event associated with a test set of the plurality of test sets; and
   in response to the replacement policy change trigger event, operating non-test sets of the cache according to a replacement policy associated with the test set, wherein the replacement policy is selected based on the miss counts for each test set.

2. The method of claim 1, wherein detecting the replacement policy trigger event comprises detecting that one of the miss counts associated with a test set of the plurality of test sets is lower than miss counts associated with misses for each other test set of the plurality of test sets.

3. The method of claim 2, further comprising storing the miss counts in a plurality of counters.

4. The method of claim 3, further comprising detecting that a count stored in a counter of the plurality of counters has reached maximum value; and decrementing each count in each counter in response to the count stored in the counter reaching the maximum value.

5. The method of claim 1, wherein the plurality of test sets includes three test sets.

6. The method of claim 1, further comprising:
   detecting a high confidence event; and
   in response to the high confidence event, switching to a no-test mode.

7. The method of claim 6, wherein, in the no-test mode, the test sets of the plurality of test sets and the non-test sets are operated with the same replacement policy.

8. The method of claim 6, wherein the high confidence event includes detecting that a performance event value associated with a test set of the plurality of test sets is lower than all other performance event values for the test sets of the plurality of test sets by a threshold amount.

9. The method of claim 1, wherein the tracking further includes incrementing a miss count of the miss counts in response to a miss occurring for a test set of the plurality of test sets.

10. The method of claim 1, wherein the tracking further includes incrementing a miss count of the miss counts in response to a miss occurring for a test set of the plurality of test sets.

11. A system comprising:
   a plurality of counters;
   a cache memory configured to store a plurality of test sets and a plurality of non-test sets; and
   a cache controller configured to:
      track performance events for the plurality of test sets, the performance events including a miss count for each test set, the tracking including decrementing all miss counts in response to at least one miss count arriving at a maximum value, where in the miss counts are stored in the plurality of counters;

detect a replacement policy change trigger event associated with a test set of the plurality of test sets; and in response to the replacement policy change trigger event, operate the plurality of non-test sets according to a replacement policy associated with the test set, wherein the replacement policy is selected based on the miss counts for each test set.

12. The system of claim 11, wherein detecting the replacement policy trigger event comprises detecting that one of the miss counts associated with a test set of the plurality of test sets is lower than miss counts associated with misses for each other test set of the plurality of test sets.

13. The system of claim 12, wherein the cache controller is further configured to store the miss counts in a plurality of counters.

14. The system of claim 13, wherein the cache controller is further configured to:

detect that a count stored in a counter of the plurality of counters has reached maximum value; and decrement each count in each counter in response to the count stored in the counter reaching the maximum value.

15. The system of claim 11, wherein the plurality of test sets includes three test sets.

16. The system of claim 11, wherein the cache controller is further configured to:

detect a high confidence event; and in response to the high confidence event, switch to a no-test mode.

17. The system of claim 16, wherein, in the no-test mode, the test sets of the plurality of test sets and the non-test sets are operated with the same replacement policy.

18. The system of claim 16, wherein the high confidence event includes detecting that a performance event value associated with a test set of the plurality of test sets is lower than all other performance event values for the test sets of the plurality of test sets by a threshold amount.

19. A system, including:

a plurality of counters;

a cache memory configured to store a plurality of test sets and a plurality of non-test sets; and a cache controller configured to:

store performance events for the plurality of test sets in the plurality of counters, wherein the performance events comprise misses in the plurality of test sets, the performance events including a miss count for each test set, the storing including decrementing all miss counts in response to at least one miss count arriving at a maximum value;

detect a replacement policy change trigger event associated with a test set of the plurality of test sets, wherein detecting the replacement policy trigger event comprises detecting that a count associated with misses for a test set of the plurality of test sets is lower than counts associated with misses for each other test set of the plurality of test sets, wherein the count is stored in the plurality of counters; and in response to the replacement policy change trigger event, operate the plurality of non-test sets according to a replacement policy associated with the test set, wherein the replacement policy is selected based on the miss counts for each test set.

20. The system of claim 19, wherein the plurality of test sets includes three test sets.

* * * * *